United States Patent
Yu et al.

(10) Patent No.: US 8,613,541 B2
(45) Date of Patent: Dec. 24, 2013

(54) LIGHT GUIDE PLATE AND BACKLIGHT MODULE INCLUDING SAME

(75) Inventors: Tai-Cherng Yu, New Taipei (TW); Da-Wei Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 191 days.

(21) Appl. No.: 13/275,333

(22) Filed: Oct. 18, 2011

(65) Prior Publication Data
US 2013/0027908 A1    Jan. 31, 2013

(30) Foreign Application Priority Data
Jul. 28, 2011 (TW) .............................. 100126728 A

(51) Int. Cl.
  *G09F 13/04*    (2006.01)
  *F21V 8/00*    (2006.01)

(52) U.S. Cl.
  USPC ............ 362/612; 362/613; 362/621; 362/628

(58) Field of Classification Search
  USPC .................................. 362/612, 613, 621, 628
  See application file for complete search history.

(56) References Cited

U.S. PATENT DOCUMENTS 8,167,474 B2 *    5/2012    Tanoue et al. ................. 362/607

* cited by examiner

*Primary Examiner* — Stephen F Husar
*Assistant Examiner* — James Cranson, Jr.
(74) *Attorney, Agent, or Firm* — Altis Law Group, Inc.

(57) ABSTRACT

A backlight module includes a light guide plate and a plurality of light sources. The light guide plate includes a wedge-shaped light incident part and a flat panel. The wedge-shaped light incident part and the flat panel have a common bottom surface. The height of the wedge-shaped light incident part is greater than that of the flat panel. The wedge-shaped light incident part includes a light incident surface perpendicular to the bottom surface and a sloped surface sloping relative to the light incident surface and connects to the flat panel. The sloped surface defines a plurality of V-shaped grooves for preventing light leak. The flat panel includes a light emitting surface opposite to the bottom surface. The plurality of light sources is positioned adjacent to the light incident surface.

13 Claims, 3 Drawing Sheets

LIGHT GUIDE PLATE AND BACKLIGHT MODULE INCLUDING SAME

BACKGROUND

1. Technical Field

The present disclosure relates to a backlight module and a light guide plate used in the backlight module.

2. Description of Related Art

A backlight module is typically used for illuminating a liquid crystal panel. The backlight module includes a light source and a light guide plate adjacent to the light source for an even distribution of light emitted from the light source. However, a light usage ratio of the light guide plate is typically low.

Therefore, it is desirable to provide a light guide plate and a backlight module which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
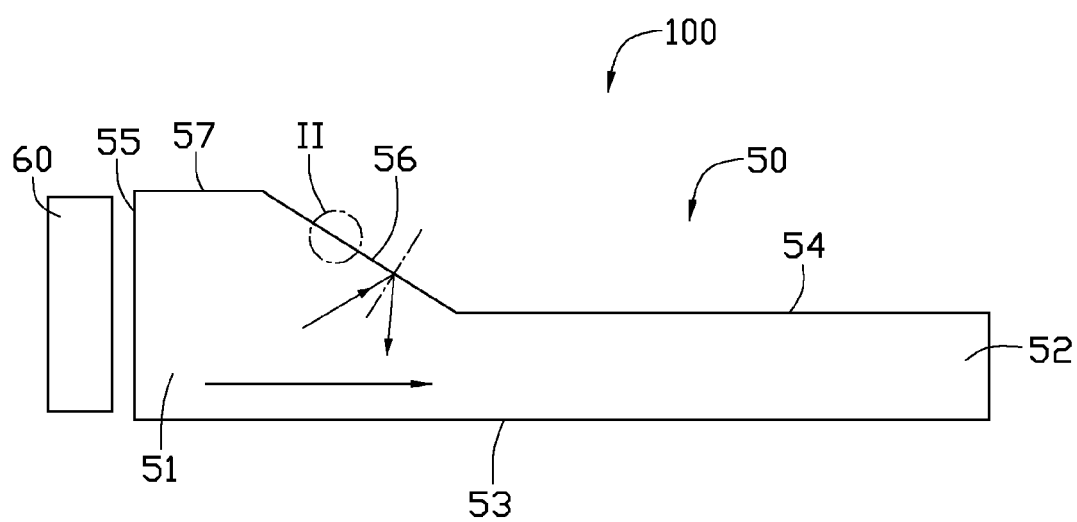
FIG. 1 is a schematic, side view of a backlight module according to an exemplary embodiment of the present disclosure.
Figure 2:
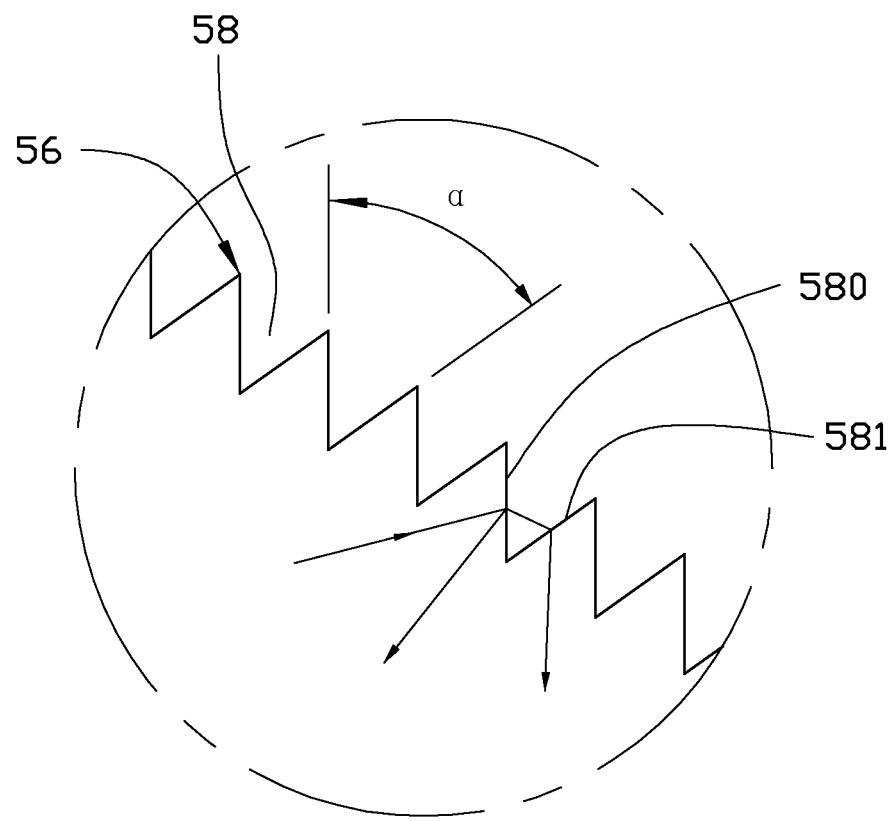
FIG. 2 is an enlarged view of a circled portion II of FIG. 1.
Figure 3:
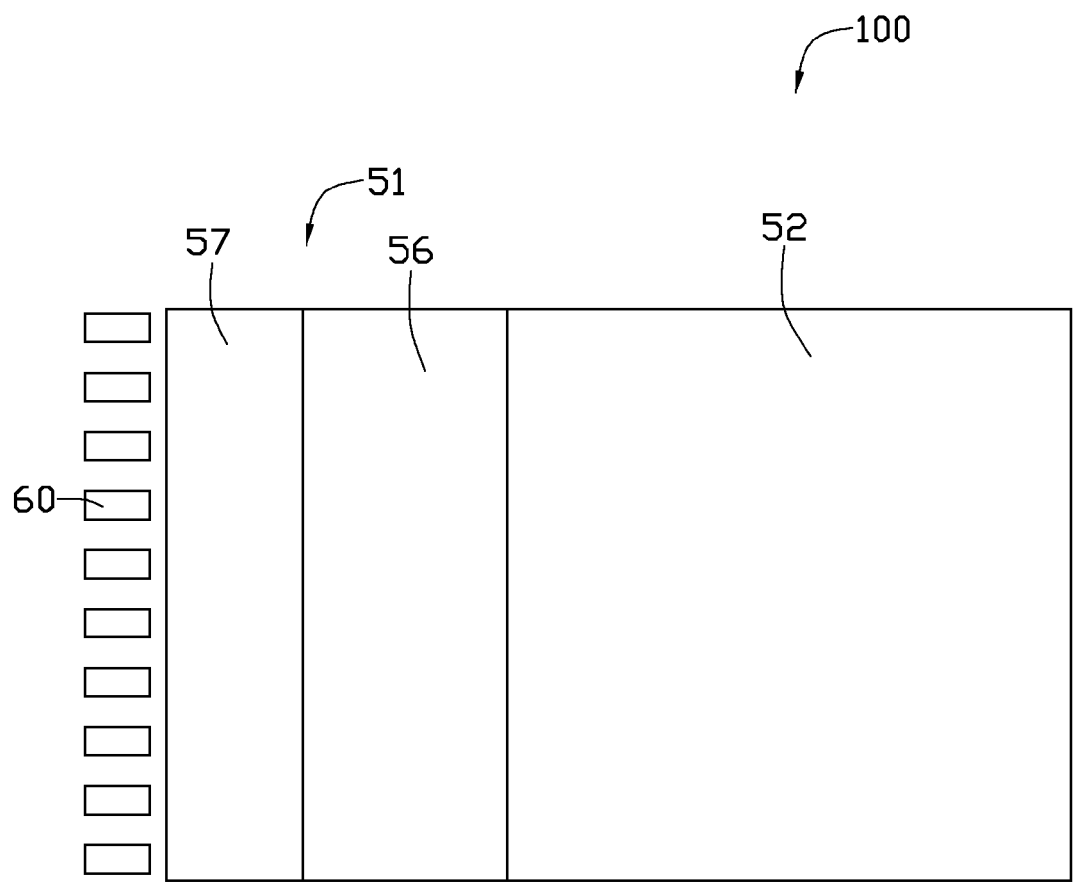
FIG. 3 is a top view of the backlight module of FIG. 1.

Referring to FIGS. 1 to 3, a backlight module 100 according to an exemplary embodiment, is disclosed. The backlight module 100 includes a light guide plate 50 and a number of light sources 60 positioned adjacent to the light guide plate 50. In this embodiment, the light sources 60 are LEDs. The light guide plate 50 is made of plastic. The light guide plate 50 includes a wedge-shaped light incident part 51 adjacent to the light sources 60 and a flat panel 52 connected to the light incident part 51 away from the light sources 60. The light incident part 51 and the panel 52 are integrally formed. The light incident part 51 and the panel 52 have a common bottom surface 53. The panel 52 includes a light emitting surface 54 opposite to the bottom surface 53. The light incident part 51 includes a light incident surface 55 adjacent to the light sources 60, a connecting surface 57 connecting to the light incident surface 55, and a sloped surface 56 connecting between the light emitting surface 54 and the connecting surface 57. The light incident surface 55 is substantially perpendicular to the bottom surface 53 The connecting surface 57 is parallel to the bottom surface 53. An LCD (not shown) is positioned on the light emitting surface 54.

The sloped surface 56 defines a number of V-shaped grooves 58. Each V-shaped groove 58 includes a first surface 580 and a second surface 581 connected to the first surface 580. The first surface 580 is adjacent to the incident surface 55 relative to the second surface 581. The height of the light incident part 51 (the distance between the bottom surface 53 and the connecting surface 57) is about 0.7 millimeters (mm), the height of the panel 52 (the distance between the bottom surface 53 and the light surface 54) is about 0.5 mm. The included angle a between the first surface 580 and the second surface 581 is in the range from about 20° to about 60°, and the depth of the V-shaped groove 58 is in the range from about 20 μm to about 50 μm.

When in use, light emitted from the light sources 60 enters into the light guide plate 50 through the light incident surface 55. A first part of the light is directed to the sloped surface 56 and a second part of the light is directed to the bottom surface 53 and the panel 52. The V-shaped grooves 58 can enlarge the incident angle of the first part of the light reaching the sloped surface 56. When the incident angle is equal to or bigger than a total reflection angle of the light guide plate 50, the first part of the light will be totally reflected by the first surface 580 towards the bottom surface 53, and will not emit out of the light guide plate 50 through the first surface 580. Even if the incident angle is still smaller than the total reflection angle, yet, as the incident angle is enlarged, the refraction angle will be enlarged accordingly, that is, the light emitted out of the light guide plate 50 through the first surface 580 is more probably directed to the second surface 581 and enters the light guide plate 50 again through the second surface 581. In this way, light leaks from the sloped surface 56 is reduced or evenly emitted and a light usage ratio of the light guide plate 50 is enhanced.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A backlight module comprising:
    a light guide plate comprising a wedge-shaped light incident part and a flat panel, the wedge-shaped light incident part and the flat panel having a common bottom surface, a height of the wedge-shaped light incident part being greater than that of the flat panel, the wedge-shaped light incident part comprising a light incident surface perpendicular to the bottom surface and a sloped surface sloping relative to the light incident surface and connecting to the flat panel, the sloped surface defining a plurality of V-shaped grooves, each V-shaped groove comprising a first surface and a second surface connected to the first surface, the first surface being adjacent to the light incident surface relative to the second surface, the flat panel comprising a light emitting surface opposite to the bottom surface; and
    a plurality of light sources positioned adjacent to the light incident surface.

2. The backlight module of claim 1, wherein an included angle of each V-shaped groove is in the range from about 20° to about 60°.

3. The backlight module of claim 1, wherein a depth of each V-shaped groove is in the range from about 20 μm to about 50 μm.

4. The backlight module of claim 1, wherein the light sources are LEDs.

5. The backlight module of claim 1, wherein the light guide plate is made of plastic.

6. The backlight module of claim 1, wherein the wedge-shaped light incident part further comprises a connecting surface connecting between the light incident surface and the sloped surface.

7. A light guide plate comprising:
    a wedge-shaped light incident part; and
    a flat panel; wherein the wedge-shaped light incident part and the flat panel have a common bottom surface, a height of the wedge-shaped light incident part is greater than that of the flat panel, the wedge-shaped light incident part comprises a light incident surface perpendicular to the bottom surface and a sloped surface sloping relative to the light incident surface and connecting to the flat panel, the sloped surface defines a plurality of V-shaped grooves for preventing light leak, each V-shaped groove comprises a first surface and a second surface connected to the first surface, the first surface is adjacent to the light incident surface relative to the second surface, and the flat panel comprises a light emitting surface opposite to the bottom surface.

8. The light guide plate of claim 7, wherein an included angle of each V-shaped groove is in the range from about 20° to about 60°.

9. The light guide plate of claim 7, wherein a depth of each V-shaped groove is in the range from about 20 μm to about 50 μm.

10. The light guide plate of claim 7, wherein the light guide plate is made of plastic.

11. The light guide plate of claim 7, wherein the wedge-shaped light incident part further comprises a connecting surface connecting between the light incident surface and the sloped surface.

12. The backlight module of claim 1, wherein any portion of the first surface except a boundary of the first surface and the second surface is adjacent to the light incident surface relative to any portion of the second surface.

13. The light guide plate of claim 7, wherein any portion of the first surface except a boundary of the first surface and the second surface is adjacent to the light incident surface relative to any portion of the second surface.

* * * * *